US012605859B2

(12) United States Patent
Lu

(10) Patent No.: US 12,605,859 B2
(45) Date of Patent: Apr. 21, 2026

(54) ADJUSTMENT STRUCTURE OF MULTI-FUNCTIONAL VEGETABLE CUTTER

(71) Applicant: Congqiang Lu, Taizhou (CN)

(72) Inventor: Congqiang Lu, Taizhou (CN)

( * ) Notice: Subject to any disclaimer, the term of this patent is extended or adjusted under 35 U.S.C. 154(b) by 172 days.

(21) Appl. No.: 18/607,123

(22) Filed: Mar. 15, 2024

(65) Prior Publication Data

US 2024/0316817 A1 Sep. 26, 2024

(30) Foreign Application Priority Data

Mar. 24, 2023 (CN) ......................... 202320638578.4

(51) Int. Cl.
*B26D 7/26* (2006.01)
*B26D 1/11* (2006.01)
*B26D 3/28* (2006.01)

(52) U.S. Cl.
CPC .............. *B26D 7/2628* (2013.01); *B26D 1/11* (2013.01); *B26D 3/283* (2013.01); *B26D 2210/02* (2013.01)

(58) Field of Classification Search
CPC ........ B26D 7/2628; B26D 3/283; B26D 1/11; B26D 2003/288; B26D 2210/02; Y02P 60/14
USPC ..................................................... 833/699.61
See application file for complete search history.

(56) References Cited

U.S. PATENT DOCUMENTS 11,597,116 B1 * 3/2023 Kent .................... B26D 7/0641
2017/0021515 A1 * 1/2017 Colburn ................. B26D 3/283

* cited by examiner

*Primary Examiner* — Nhat Chieu Q Do
(74) *Attorney, Agent, or Firm* — Westbridge IP LLC

(57) ABSTRACT

Disclosed is an adjustment structure of a multi-functional vegetable cutter, including a cutting mechanism slidably moving in a housing. The cutting mechanism includes a frame and an upper cutting plane and a lower cutting plane that are disposed in the frame, a lower end of the upper cutting plane is provided with a parallel cutting blade, and an upper end of the lower cutting plane is provided with a first vertical cutting assembly. The first vertical cutting assembly includes a first blade bracket and first vertical cutting blades, a lifting frame is slidably disposed in the frame along a length direction, the lifting frame is provided with a pair of first lifting grooves, two ends of the first blade bracket are provided with blade bracket sliders that fit with the first lifting grooves and ascend or descend along a trajectory of the first lifting grooves.

6 Claims, 5 Drawing Sheets

ADJUSTMENT STRUCTURE OF MULTI-FUNCTIONAL VEGETABLE CUTTER

CROSS-REFERENCE TO RELATED APPLICATIONS

This application claims priority to Chinese Patent Application No. 202320638578.4, filed on Mar. 24, 2023, the content of which is incorporated herein by reference in its entirety.

TECHNICAL FIELD

The present disclosure relates to the technical field of vegetable cutters, and relates to an adjustment structure of a multi-functional vegetable cutter.

BACKGROUND

A vegetable cutter is a common food processing device used for cutting food. A multi-functional vegetable cutter can cut food into slices or shreds as needed to meet different requirements.

For example, Chinese Utility Model Patent Publication No. CN208629506U discloses a food cutter. The food cutter includes a housing and a cutting mechanism. The cutting mechanism includes a cutting portion and a pulling portion configured to control the cutting portion to move back and forth. The cutting portion includes a sliding member, a first knife, and a plurality of second knives. The sliding member is slidably connected to the housing, and in a process of the pulling portion pulling the sliding member to move back and forth, the food can be cut into slices.

In the foregoing food cutter, the state of a second cutting knife can be adjusted separately using a screw pile, but an end portion of the screw pile is difficult to manually adjust and inconvenient to use. In addition, the screw pile exceeds a cutter, and its layout is not ideal either.

SUMMARY

In view of the defects in the prior art, the present disclosure provides an adjustment structure of a multi-functional vegetable cutter, and has advantages of a simple structure, convenient operation, and a more proper space layout.

To resolve the foregoing technical problem, an objective of the present disclosure is achieved using the following technical solution.

An adjustment structure of a multi-functional vegetable cutter is provided, including a cutting mechanism slidably moving in a housing. The cutting mechanism includes a frame and an upper cutting plane and a lower cutting plane that are disposed in the frame, a lower end of the upper cutting plane is provided with a parallel cutting blade, and an upper end of the lower cutting plane is provided with a first vertical cutting assembly. The first vertical cutting assembly includes a first blade bracket slidably moving in the frame along a height direction and a plurality of first vertical cutting blades penetrating through the lower cutting plane, a lifting frame is slidably disposed in the frame along a length direction, the lifting frame is provided with a pair of first lifting grooves, two ends of the first blade bracket are provided with blade bracket sliders that fit with the first lifting grooves and ascend or descend along a trajectory of the first lifting grooves, the frame is rotatably provided with a knob driving the lifting frame to move, and the knob drives the lifting frame via a gear and a gear rack.

In the foregoing adjustment structure of a multi-functional vegetable cutter, a gear seat is disposed in the frame, a gear shaft is rotatably disposed in the gear seat, the gear shaft is fixed to a gear, the gear is fixed to a knob, an upper end of the lifting frame is provided with a strip-shaped groove accommodating the gear shaft, and the lifting frame is provided with a gear rack meshed with the gear.

In the foregoing adjustment structure of a multi-functional vegetable cutter, a bottom of the gear shaft is provided with a locking seat, the locking seat is provided with a plurality of locking planes, the locking planes are connected via a curved surface, a side of the gear seat is provided with a plurality of locking chutes, a locking block is slidably disposed in the locking chute, a locking spring is disposed between the locking block and the locking chute, and the locking block abuts against the locking plane. Preferably, the locking seat has four locking planes, and two locking chutes are provided and perpendicular to each other.

In the foregoing adjustment structure of a multi-functional vegetable cutter, a side wall of the frame is provided with a plurality of strip-shaped chutes, and two sides of the lifting frame are provided with strip-shaped sliders fitting with the strip-shaped chutes. Preferably, two pairs of strip-shaped chutes and two pairs of strip-shaped sliders are provided and located at different heights.

In the foregoing adjustment structure of a multi-functional vegetable cutter, the upper end of the lower cutting plane is further provided with a second vertical cutting assembly, the second vertical cutting assembly includes a second blade bracket slidably moving in the frame along the height direction and a plurality of second vertical cutting blades penetrating through the lower cutting plane, the lifting frame is provided with a pair of second lifting grooves, two ends of the second blade bracket are provided with blade bracket sliders that fit with the second lifting grooves and ascend or descend along a trajectory of the second lifting grooves, and the first vertical cutting blade and the second vertical cutting blade, as well as the first lifting groove and the second lifting groove, are vertically staggered. Further, the first blade bracket and the second blade bracket are each provided with a convex structure and a concave structure that fit with each other.

In the foregoing adjustment structure of a multi-functional vegetable cutter, the first lifting groove includes two horizontal segments and a tilted segment connecting the horizontal segments. When the blade bracket slider of the first blade bracket is located on the two horizontal segments separately, the first vertical cutting assembly is in an operating state and a retracted state separately; and the second lifting groove includes two horizontal segments and a tilted segment connecting the horizontal segments, when the blade bracket slider of the second blade bracket is located on the two horizontal segments separately, the second vertical cutting assembly is in an operating state and a retracted state separately.

In the foregoing adjustment structure of a multi-functional vegetable cutter, a lifting cavity accommodating the first blade bracket and the second blade bracket is provided in the frame, two pairs of blade bracket chutes are disposed on two sides of the lifting cavity, the first blade bracket and the second blade bracket are slidably disposed in the two pairs of blade bracket chutes, respectively, and a cover plate fixedly connected to the frame is disposed above the lifting cavity.

Compared with the prior art, the present disclosure has the following beneficial effects.

Firstly, the present disclosure provides an adjustment structure of a vegetable cutter, and a lifting frame is driven, using a knob, to move up and down, so as to adjust the state of the vertical cutting assembly. The present disclosure has advantages of a simple structure, convenient operation, and a proper space layout.

Secondly, the present disclosure can be further provided with two vertical cutting assemblies, and the same knob can be used to drive the two vertical cutting assemblies to switch the use state, thus easily meeting more use requirements.

Lastly, the present disclosure adds a locking structure at the knob, which can prevent the knob from rotating during vegetable cutting, allowing the vertical cutting assembly to be more stable during operation. Fitting with different locking planes, the locking structure can further provide adjustment positions for the knob, to assist in adjustment of the knob, allowing for more convenient adjustment.

DETAILED DESCRIPTION OF THE EMBODIMENTS

Figure 1:
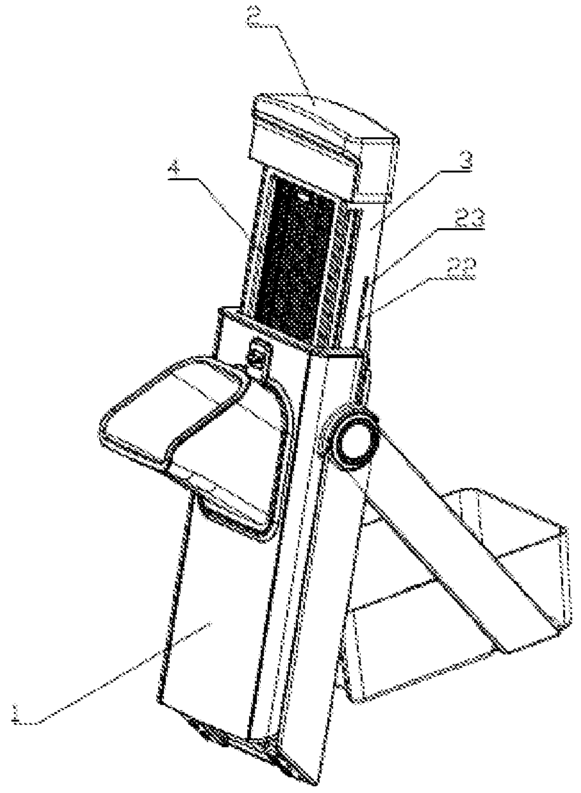
FIG. 1 is a three-dimensional diagram according to the present disclosure.
Figure 2:
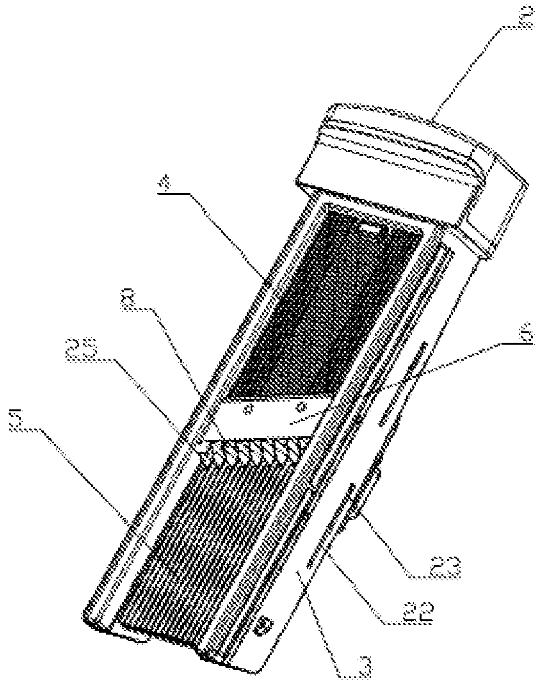
FIG. 2 is a three-dimensional diagram of a cutting mechanism according to the present disclosure.
Figure 3:
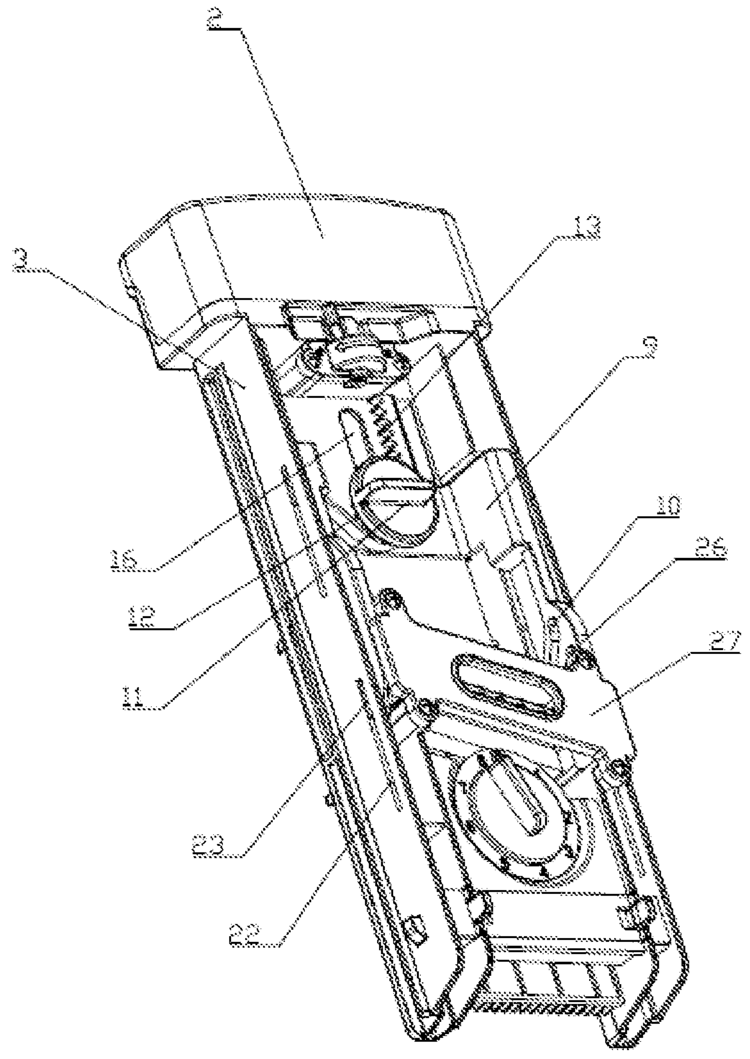
FIG. 3 is another three-dimensional diagram of a cutting mechanism according to the present disclosure.
Figure 4:
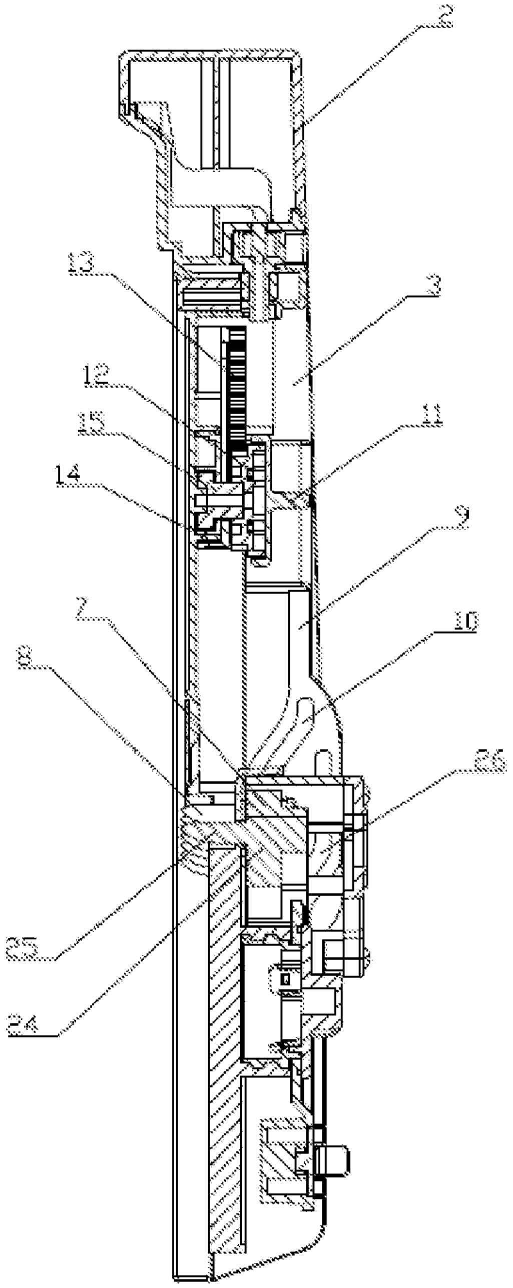
FIG. 4 is a cross-sectional diagram of FIG. 2.

The present disclosure is further described below with reference to the accompanying drawings and a specific embodiment.

Referring to FIGS. 1 to 8, an adjustment structure of a multi-functional vegetable cutter is provided, including a cutting mechanism 2 slidably moving in a housing 1. The cutting mechanism 2 includes a frame 3 and an upper cutting plane 4 and a lower cutting plane 5 that are disposed in the frame 3, a lower end of the upper cutting plane 4 is provided with a parallel cutting blade 6, and an upper end of the lower cutting plane 5 is provided with a first vertical cutting assembly. The first vertical cutting assembly includes a first blade bracket 7 slidably moving in the frame 3 along a height direction and a plurality of first vertical cutting blades 8 penetrating through the lower cutting plane 5, a lifting frame 9 is slidably disposed in the frame 3 along a length direction, the lifting frame 9 is provided with a pair of first lifting grooves 10, two ends of the first blade bracket 7 are provided with blade bracket sliders that fit with the first lifting grooves 10 and ascend or descend along a trajectory of the first lifting grooves 10, the frame 3 is rotatably provided with a knob 11 driving the lifting frame 9 to move, and the knob 11 drives the lifting frame 9 via a gear 12 and a gear rack 13.

Figure 5:
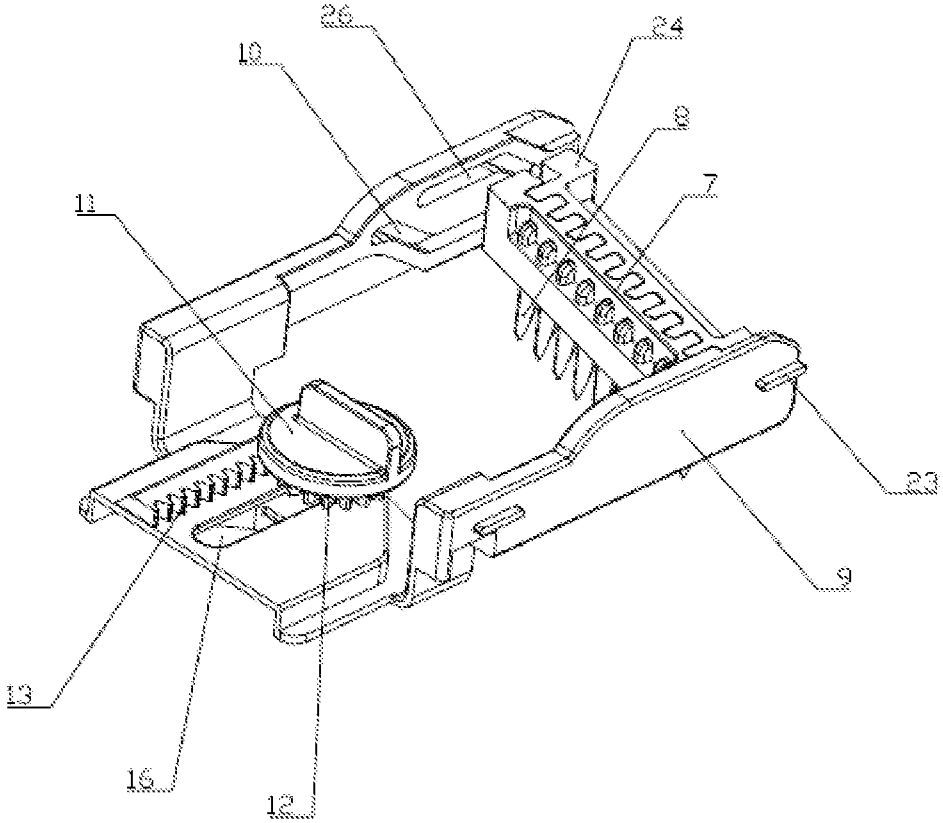
FIG. 5 is a three-dimensional diagram of a driving assembly according to the present disclosure.

Referring to FIG. 5, a gear seat 14 is disposed in the frame 3, a gear shaft 15 is rotatably disposed in the gear seat 14, the gear shaft 15 is fixed to a gear 12, the gear 12 is fixed to a knob 11, an upper end of the lifting frame 9 is provided with a strip-shaped groove 16 accommodating the gear shaft 15, and the lifting frame 9 is provided with a gear rack 13 meshed with the gear 12.

In this embodiment, the process of the knob 11 driving the first vertical cutting assembly to ascend or descend is as follows: The knob 11 is rotated manually, and the gear 12 and the gear shaft 15 rotate along with it. The gear 12 and the gear rack 13 drive the lifting frame 9 to move vertically. When the lifting frame 9 moves vertically, the blade bracket slider moves along the trajectory of the first lifting groove 10, to change its position in the height direction, thus further driving the first blade bracket 7 and the first vertical cutting blade 8 to ascend or descend.

A side wall of the frame 3 is provided with a plurality of strip-shaped chutes 22, and two sides of the lifting frame 9 are provided with strip-shaped sliders 23 fitting with the strip-shaped chutes. Preferably, two pairs of strip-shaped chutes 22 and two pairs of strip-shaped sliders 23 are provided and located at different heights.

To meet more cutting requirements and obtain finer shreds, the upper end of the lower cutting plane 5 is further provided with a second vertical cutting assembly, the second vertical cutting assembly includes a second blade bracket 24 slidably moving in the frame 3 along the height direction and a plurality of second vertical cutting blades 25 penetrating through the lower cutting plane 5, the lifting frame 9 is provided with a pair of second lifting grooves 26, two ends of the second blade bracket 24 are provided with blade bracket sliders that fit with the second lifting grooves 26 and ascend or descend along a trajectory of the second lifting grooves 26, and the first vertical cutting blade 8 and the second vertical cutting blade 25, as well as the first lifting groove 10 and the second lifting groove 26, are vertically staggered. Further, the first blade bracket 7 and the second blade bracket 24 are each provided with a convex structure and a concave structure that fit with each other.

The first lifting groove 10 includes two horizontal segments and a tilted segment connecting the horizontal segments. When the blade bracket slider of the first blade bracket 7 is located on the two horizontal segments separately, the first vertical cutting assembly is in an operating state and a retracted state separately. The second lifting groove 26 includes two horizontal segments and a tilted segment connecting the horizontal segments, and when the blade bracket slider of the second blade bracket 24 is located on the two horizontal segments separately, the second vertical cutting assembly is in an operating state and a retracted state separately.

In the present disclosure, the process of the knob 11 driving the two vertical cutting assemblies is as follows: In an initial state, the blade bracket slider of the first blade bracket 7 and the blade bracket slider of the second blade bracket 24 are both located on the lower horizontal segments, the first vertical cutting blade 8 and the second vertical cutting blade 25 are both in the retracted state. The lifting frame 9 is moved up, the blade bracket slider of the first blade bracket 7 moves from the lower horizontal segment onto the upper horizontal segment via the tilted segment, and the blade bracket slider of the second blade bracket 24 slides on the lower horizontal segment all the time. In this case, the first vertical cutting blade 8 extends, and the second vertical cutting blade 25 is still in the retracted state. The lifting frame 9 is moved up continuously, the blade bracket slider of the first blade bracket 7 slides on the upper horizontal segment all the time, and the blade bracket slider of the second blade bracket 24 moves onto the upper horizontal segment via the tilted segment. In this case, the first vertical cutting blade 8 and the second vertical cutting blade 25 both extend.

Figure 6:
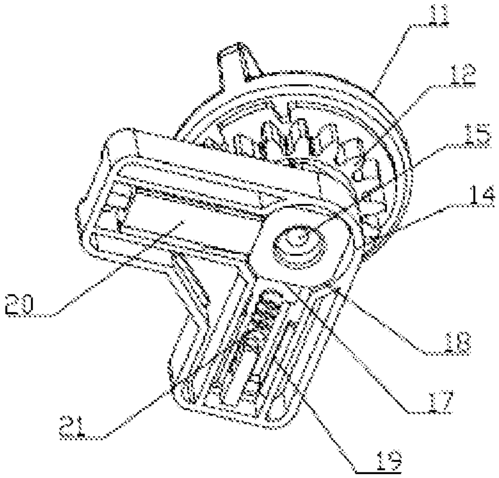
FIG. 6 is a three-dimensional diagram of a knob assembly according to the present disclosure.
Figure 7:
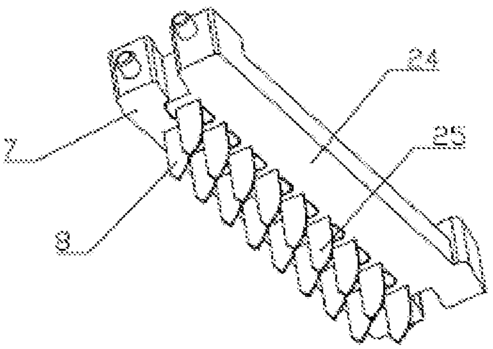
FIG. 7 is a three-dimensional diagram of a blade bracket assembly according to the present disclosure.
Figure 8:
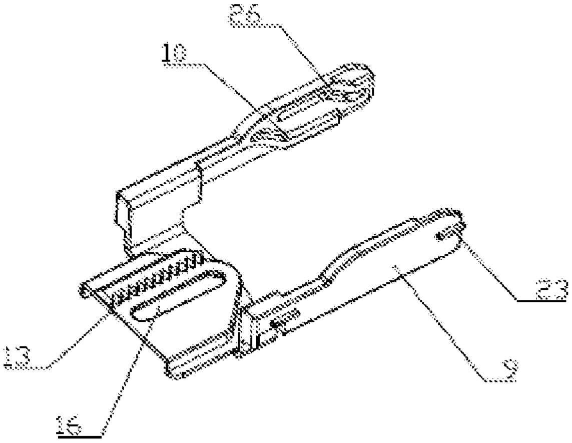
FIG. 8 is a three-dimensional diagram of a lifting frame according to the present disclosure.

Referring to FIG. 6, a bottom of the gear shaft 15 is provided with a locking seat, the locking seat is provided with a plurality of locking planes 17, the locking planes 17 are connected via a curved surface 18, a side of the gear seat 14 is provided with a plurality of locking chutes 19, a locking block 20 is slidably disposed in the locking chute 19, a locking spring 21 is disposed between the locking block 20 and the locking chute 19, and the locking block 20 abuts against the locking plane 17. Preferably, the locking seat has four locking planes 17, and two locking chutes 19 are provided and perpendicular to each other. After the locking seat rotates by 90 degrees every time, the locking seat and the locking block 20 form a locking structure. Specifically, in this embodiment, after rotation by 90 degrees from the initial state, the first vertical cutting blade 8 extends, and after another rotation by 90 degrees, the second vertical cutting blade 25 extends. Then, a reverse rotation is performed by 90 degrees, the second vertical cutting blade 25 is retracted, and another reverse rotation is performed by 90 degrees, the first vertical cutting blade 8 is retracted to return to the initial state.

To enable the first blade bracket 7 and the second blade bracket 24 to stably slide along the height direction, a lifting cavity accommodating the first blade bracket 7 and the second blade bracket 24 is provided in the frame 3, two pairs of blade bracket chutes are disposed on two sides of the lifting cavity, the first blade bracket 7 and the second blade bracket 24 are slidably disposed in the two pairs of blade bracket chutes, respectively, and a cover plate 27 fixedly connected to the frame 3 is disposed above the lifting cavity.

The above embodiment is only a preferred embodiment of the present disclosure and does not limit the protection scope of the present disclosure. Therefore, any equivalent changes made based on the structure, shape, principles of the present disclosure should be included within the protection scope of the present disclosure.

What is claimed is:

1. A multi-functional vegetable cutter, comprising a cutting mechanism slidably moving in a housing, wherein the cutting mechanism comprises a frame and a first cutting plane and a second cutting plane that are disposed in the frame, an end of the first cutting plane is provided with a parallel cutting blade, and an end of the second cutting plane is provided with a first cutting assembly;

the first cutting assembly comprises a first blade bracket slidably moving in the frame along a height direction and a plurality of first cutting blades penetrating through the second cutting plane, a lifting frame is slidably disposed in the frame along a length direction, the lifting frame is provided with a pair of first lifting grooves;

two ends of the first blade bracket are provided with blade bracket sliders that fit with the first lifting grooves and ascend or descend along a trajectory of the first lifting grooves, the frame is rotatably provided with a knob driving the lifting frame to move, and the knob drives the lifting frame via a gear and a gear rack; and a side wall of the frame is provided with a plurality of strip-shaped chutes, and two sides of the lifting frame are provided with strip-shaped sliders fitting with the strip-shaped chutes.

2. The multi-functional vegetable cutter according to claim 1, wherein a gear seat is disposed in the frame, a gear shaft is rotatably disposed in the gear seat, the gear shaft is fixed to the gear, the gear is fixed to the knob, an upper end of the lifting frame is provided with a strip-shaped groove accommodating the gear shaft, and the lifting frame is provided with the gear rack meshed with the gear.

3. The multi-functional vegetable cutter according to claim 2, wherein a bottom of the gear shaft is provided with a locking seat, the locking seat is provided with a plurality of locking planes, the locking planes are connected via a curved surface, a side of the gear seat is provided with a plurality of locking chutes, a locking block is slidably disposed in the locking chute, a locking spring is disposed between the locking block and the locking chute, and the locking block abuts against the locking plane.

4. The multi-functional vegetable cutter according to claim 1, wherein the end of the second cutting plane is further provided with a second cutting assembly, the second cutting assembly comprises a second blade bracket slidably moving in the frame along the height direction and a plurality of second cutting blades penetrating through the second cutting plane, the lifting frame is provided with a pair of second lifting grooves, two ends of the second blade bracket are provided with blade bracket sliders that fit with the second lifting grooves and ascend or descend along a trajectory of the second lifting grooves, and the first cutting blade and the second cutting blade, as well as the first lifting groove and the second lifting groove, are staggered.

5. The multi-functional vegetable cutter according to claim 4, wherein the first lifting groove comprises two horizontal first segments and a second segment connecting the two first segments, the second segment is tilted relative to the two first segments, and when the blade bracket slider of the first blade bracket is located on the two first segments separately, the first cutting assembly is in an operating state and a retracted state separately; and the second lifting groove comprises two third segments and a fourth segment connecting the two third segments, the fourth segment is tilted relative to the two third segments, and when the blade bracket slider of the second blade bracket is located on the two third segments separately, the second cutting assembly is in an operating state and a retracted state separately.

6. The multi-functional vegetable cutter according to claim 4, wherein a lifting cavity accommodating the first blade bracket and the second blade bracket is provided in the frame, two pairs of blade bracket chutes are disposed on two sides of the lifting cavity, the first blade bracket and the second blade bracket are slidably disposed in the two pairs of blade bracket chutes, respectively, and a cover plate fixedly connected to the frame is disposed above the lifting cavity.

* * * * *